242-588.3
E9975 OR SR RE 010,553

J. B. WEST.

Assignor to L. N. ASIEL, & Co., and B. GALLAND.

EMBROIDERY HOLDER.

RE: 10,553. Reissued Jan. 13, 1885.

Witnesses
J. Stair
Chas H. Smith

Inventor
Jonathan B. West.
per Lemuel W. Serrell atty

UNITED STATES PATENT OFFICE.

RE10553

JONATHAN B. WEST, OF ROCHESTER, ASSIGNOR TO L. N. ASIEL & CO., OF NEW YORK, N. Y., AND BERTHOLD GALLAND, OF SAME PLACE.

EMBROIDERY-HOLDER.

SPECIFICATION forming part of Reissued Letters Patent No. 10,553, dated January 13, 1885.

Original No. 299,943, dated June 3, 1884. Application for reissue filed August 7, 1884.

*To all whom it may concern:*

Be it known that I, JONATHAN B. WEST, of Rochester, in the county of Monroe and State of New York, have invented a certain new and useful Improvement in Embroidery-Holders; and I do hereby declare that the following is a full, clear, and exact description of the same, reference being had to the accompanying drawings, in which—

Figure 1:
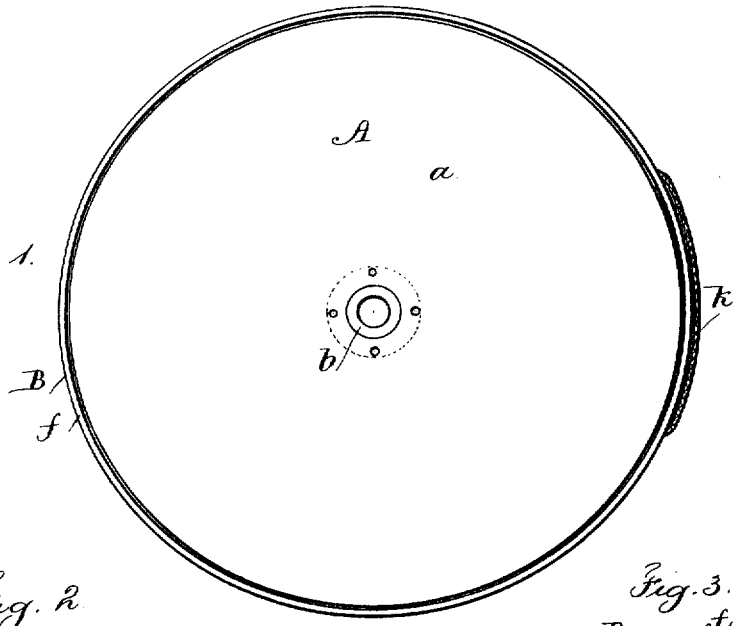
Figure 2:
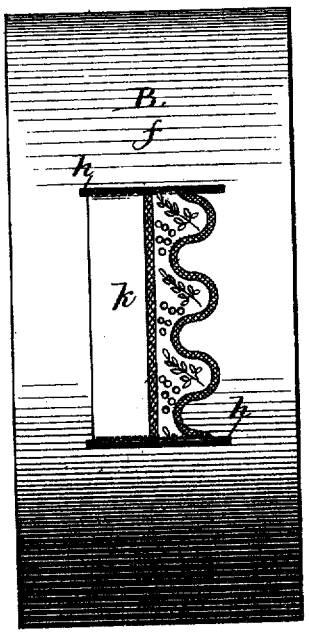
Figure 4:
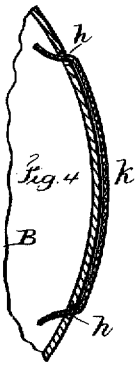
Figure 5:
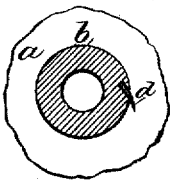
Figure 3:
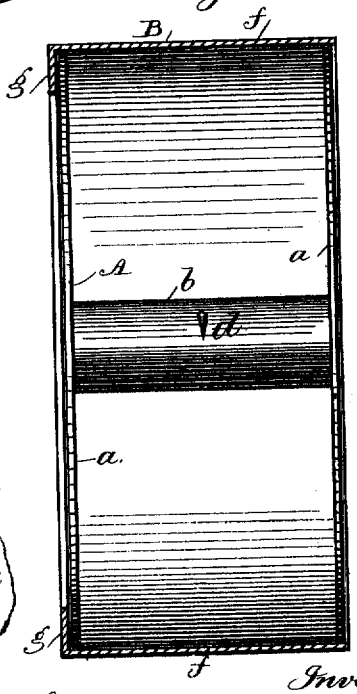

Figure 1 is a front elevation of the device. Fig. 2 is an edge elevation. Fig. 3 is a cross-section. Fig. 4 is a diagram showing a section of one edge of the box and the means for exhibiting the embroidery. Fig. 5 is a cross-section through the hub of the spool.

Embroideries, such as Hamburg edgings, &c., are worked in lines or rows on a sheet of cloth, and are rolled in that form. The purchaser must cut the sheet into strips and then notch or trim the edges. I have invented means for slitting the sheet, also for notching or trimming the edges of the embroidery, and it is designed, after the embroidery is prepared in this way, and is ready for use, to wind the strips upon a spool, like ribbons and tapes, and to keep it in store in that form.

My invention relates to a spool adapted to receive the embroidery, edging, or similar material, and to a band, into which the spool is introduced, which band is closed at its ends by the ends of the spool, and there is an inward flange at one end of the band to limit the movement of the spool when it is inserted into the band, and I provide for exhibiting a portion of the embroidery upon the exterior of the band, so that the contents may be known without opening the band.

In the drawings, A shows the spool, and B the inclosing box or receptacle.

The spool consists of two circular heads, *a a*, and a central hub, *b*, the latter being preferably hollow, and to the ends of which the circular heads are attached. Upon the hub there is a projecting point or pin, *d*, upon which the end of the embroidery is caught to wind it upon the spool. The embroidery is wound upon the spool between the two heads.

The band B is of circular or hoop form, as shown, consisting of the rim *f* and a right-angled inward flange, *g*, at the back, which acts as a stop to the spool. The front of the band is left entirely open to allow the spool to be inserted bodily therein and to form a box for the embroidery. In the rim of the box are made two slots, *h h*, standing crosswise; or, if desired, a long rectangular opening may be used, and the loose end *k* of the embroidery is passed through and remains at all times in sight as a sample. The outer head of the spool, when inserted in the band, forms the head of the box, which then presents the appearance of an ordinary circular box with both ends closed, the end of the embroidery resting on the exterior surface of the rim. The loose end of the embroidery passes out through the upper slot, and is tucked into the lower one, so that a smooth surface is presented.

The spool combined with the band as above described is in convenient form for transportation and storage, as the goods can be wound up and inclosed so as not to be exposed or to unwind. At the same time the end of the embroidery is exposed as a sample, and, if desired, the spool can be placed upon a pin or axis and the embroidery be unwound for sale without removing the band from the spool. In hand use the band serves as a hand-hole, the spool turning easily within it. Other goods—such as ribbons, tapes, &c.—may be prepared in the same way and the same kind of spool be used.

I disclaim a box made of two sections with a central core attached to one of the sections which can be turned to wind up the fabric. I also disclaim a roller which turns between two fixed heads.

I claim as my invention—

1. In an embroidery-holder, the combination, with a two-headed spool, A, of an inclosing cylindrical band, B, provided with a flange, *g*, at one end and with slots *h h* in the rim, through which a portion of the embroidery may be exposed to view, the spool fitting into and forming the heads of the box, substantially as and for the purpose herein specified.

2. The spool for embroidery or similar material formed of two flat circular heads, a hollow central hub, to the ends of which the heads are attached, and a pin projecting from the hub for hooking on the inner end of the strip of material to be wound upon such spool, substantially as specified.

3. The combination, with the spool having two flat circular heads and a central hub rigidly connected at its ends to the circular heads, of a circular band having an inward flange at one side, and adapted to receive and hold the spool, substantially as set forth, so that the heads of the spool form the ends of the box, substantially as specified.

4. The combination, with the circular band having an inward flange at one end and an opening in the rim, of a spool with two circular heads and a connecting-hub, and a projecting pin upon the hub for the reception of the strip of embroidery or similar material, substantially as set forth.

5. In combination with a spool having two heads, a band having an inward flange at one end, and adapted to receive the spool and form a box for embroidery or similar material, and to expose a portion of such embroidery, substantially as set forth.

Signed by me this 17th day of July, A. D. 1884.

JONATHAN B. WEST.

Witnesses:
P. A. COSTICH,
E. N. ADAMS.